350-3.6
SR
XR 3,911,230
X 3031Y
X 3050Y

United St[ates Patent]

Neidell

[11] 3,911,230
[45] Oct. 7, 1975

[54] HOLOGRAPHIC REPRODUCTION OF SOUND

[75] Inventor: Norman S. Neidell, Houston, Tex.

[73] Assignee: Seiscom Delta, Inc.

[22] Filed: May 23, 1970

[21] Appl. No.: 40,301

[52] U.S. Cl...... 179/100.3 G; 179/100.3 V; 350/3.5
[51] Int. Cl...................... G11b 7/00
[58] Field of Search.............. 179/100.3 V, 100.3 G; 340/174.1 L; 350/3.5; 178/6.6 R, 6.7 A

[56] References Cited

UNITED STATES PATENTS 2,086,934 7/1937 Bonneau ...................... 179/100.3 V
2,384,131 9/1945 Price ........................... 179/100.3 V
3,545,834 12/1970 Gerritsen et al. .................... 350/3.5

*Primary Examiner*—Raymond F. Cardillo, Jr.
*Attorney, Agent, or Firm*—Pravel & Wilson

[57] ABSTRACT

A recording and reproducing method in which the groove undulations of a typical disk phonographic recording are transformed into a hologram. The hologram is then mounted for relative movement with respect to a light source so that an image therefrom is superimposed on a photodetector or a detector of electromagnetic energy. The electrical signal from the photodetector is then converted to acoustical energy in an audio amplifier and loudspeaker system.

3 Claims, 6 Drawing Figures

3911230
OR IN 179/100.3G

HOLOGRAPHIC REPRODUCTION OF SOUND

BACKGROUND OF THE INVENTION

1. Field of the Invention

This invention relates to sound reproduction and more specifically to the preservation of sound on a hologram, so that a real image therefrom may be produced which is detectable with a photo-sensitive transducer element. Hence, the recording medium is isolated from contact with a wear-causing detection element.

2. DESCRIPTION OF THE PRIOR ART

Typically, sound recordings of music and voice, both monophonic and stereophonic, are made on lacquered disk "originals". Such an original recording disk normally includes an aluminum disk plate having an acetate plastic on both sides thereof suitable for accepting a groove. The surface then is pregrooved to a uniform dimension prior to being inserted in a recorder.

The recorder includes suitable amplifiers, attenuators, gain control circuits, compensation networks and the like, as well as one or more electromechanical transducers used as cutters. These cutters physically cut a wavy path in the groove of the original as it is rotated at a predetermined angular velocity, the resulting undulations mechanically preserving the intelligence of the sound. The drive on the cutters is provided by a system which acoustically detects the sound to be recorded, establishes a voltage related to such sound, and proportionally mechanically positions the cutter or cutters. The dimensional width of the groove may be varied by the cutters, the depth of the grooves may be varied by the cutters, and the slopes of the sides of the grooves may be varied by the cutters depending on the recording system. The cutters, again depending upon the system of recording, are capable of acting vertically into the groove, horizontally with respect to the groove or angularly with respect to the groove.

The original lacquered disk is then metallized and electroplated. The plating is separated from the lacquer and reinforced by backing with a solid metal plate. This assembly, called the "master," is electroplated. This plating is separated from the master and reinforced by a backing with a solid plate. The resulting assembly, the "mother," is electroplated and reinforced by a solid metal plate, forming an assembly termed the "stamper." One stamper, containing the sound selection to be placed on one side of the final record, is mounted in the upper jaw of a hydraulic press. Another stamper, containing the sound selection to be placed on the opposite side of the final record, is mounted in the lower jaw. The press is equipped for heating and cooling of the stampers.

A preform or biscuit of thermoplastic material, such as a shellac compound or Vinylite, is placed between the two stampers. The stampers are then heated, and the jaws of the press are closed. When the impression has been made and the thermoplastic material has cooled, the jaws of the press are opened and the record is removed. The modulated grooves in the record are intended to correspond to those in the original lacquer disk.

The reproducing system normally comprises a turntable for accepting the record, a turntable drive, an electromechanical pickup, amplifiers, equalizers, a volume control, power amplifiers and one or more loudspeakers. The pickup includes a stylus or needle that follows the undulations of the wavy groove in the record to generate a voltage corresponding to such undulations. It is this voltage that is translated into sound by the electroacoustical portion of the system.

It is apparent that the record-making process involves several steps of mechanical contact and the heating and cooling of plastic material. Such process has a great effect on the fidelity of the recording made from the original. Further, it is apparent that the needle or stylus of the typical sound-reproducing system causes wear to the phonograph record as it is played.

Therefore, it is one feature of the present invention to produce essentially undistorted recording apparatus from a recording original.

It is another feature of the present invention to produce a recording apparatus that can be "played" without causing wear thereto.

It is still another feature of the present invention to provide apparatus having sound recorded in the physical changes of the record, normally the groove undulations therein, which are capable of producing a real image, the image being capable of movement relative to a photodensitometer for reproducing the recorded sound.

It is yet another feature of the present invention to record sound holographically for subsequent production of a real image, which image is capable of sound detection via a photodetection process.

SUMMARY OF THE INVENTION

A preferred manner for practicing the inventive method to achieve reproduction of sound from a sound recording having the sound preserved thereon by physical undulations of varying configurations comprises holographically reproducing the image of the physical undulations on a hologram, projecting the hologram to produce a real image of at least a segment thereof, sensing with a photodetector the undulations of the real image to produce an electrical impulse proportional to the sensed image undulations, effecting relative movement between the image projected from the hologram and the photodetector, and converting the electrical impulses from the photodetector to acoustical energy susceptible of being heard. Relative movement is normally accomplished by mounting the hologram so that it can be revolved, thereby causing the real image produced therefrom to be superimposed on a fixedly-mounted photodetector and to rotate relative thereto.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

IN THE DRAWINGS

Figure 1:
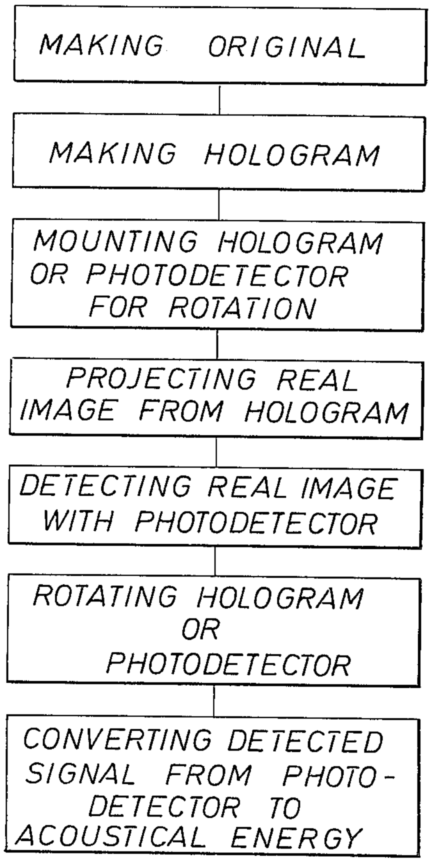

FIG. 1 is a block diagram showing the steps in a preferred method of the invention involving the making of holographic sound recordings and detecting the sound therefrom.

Figure 2:
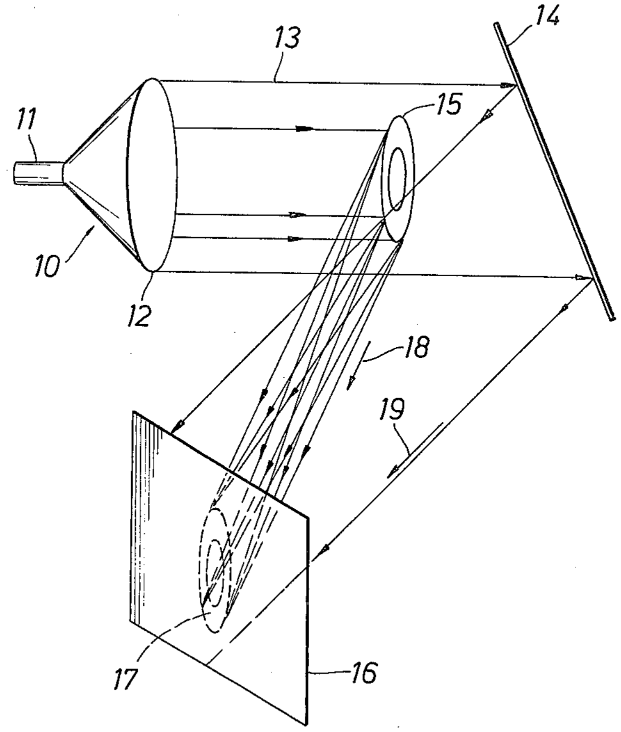

FIG. 2 is a schematic diagram of establishing a suitable holographic sound recording from an original as a step in the inventive method.

Figure 3:
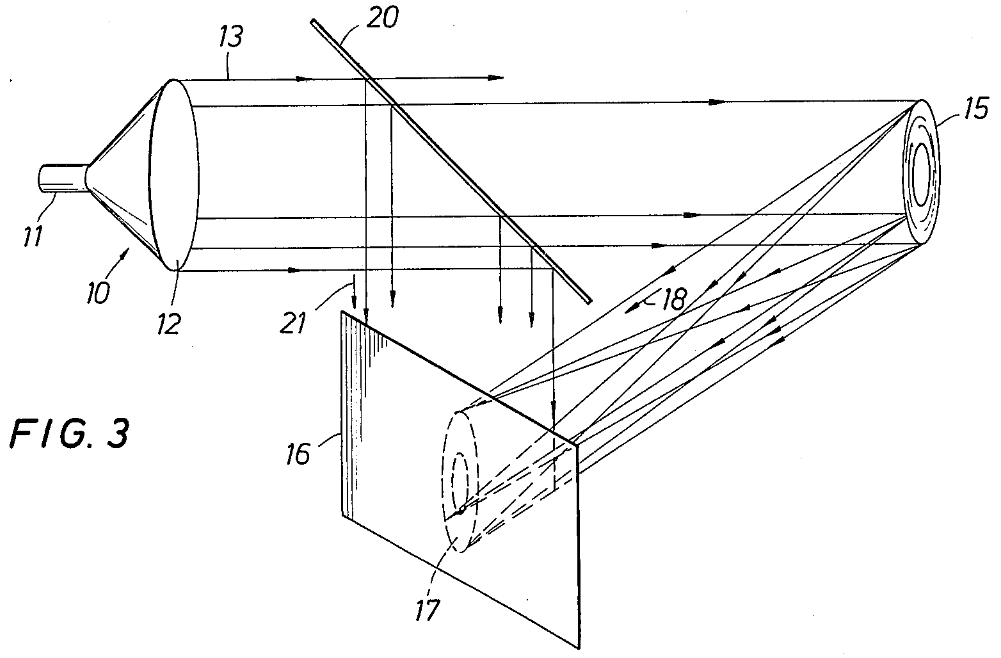

FIG. 3 is a schematic diagram of an alternate way of establishing a suitable holographic sound recording from an original as a step in the inventive method.

Figure 4:
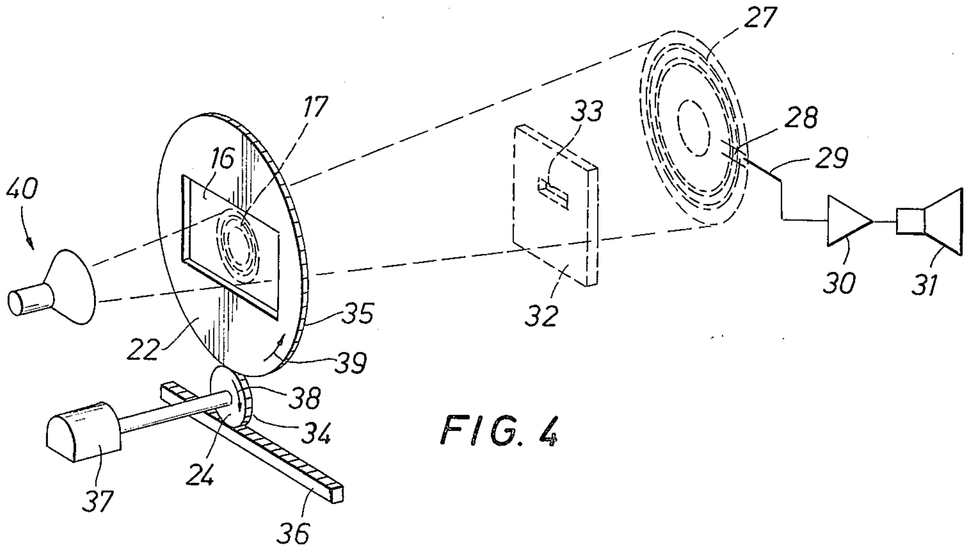

FIG. 4 is a schematic diagram of projecting a real image from a holographic sound recording and detecting such image.

Figure 5:
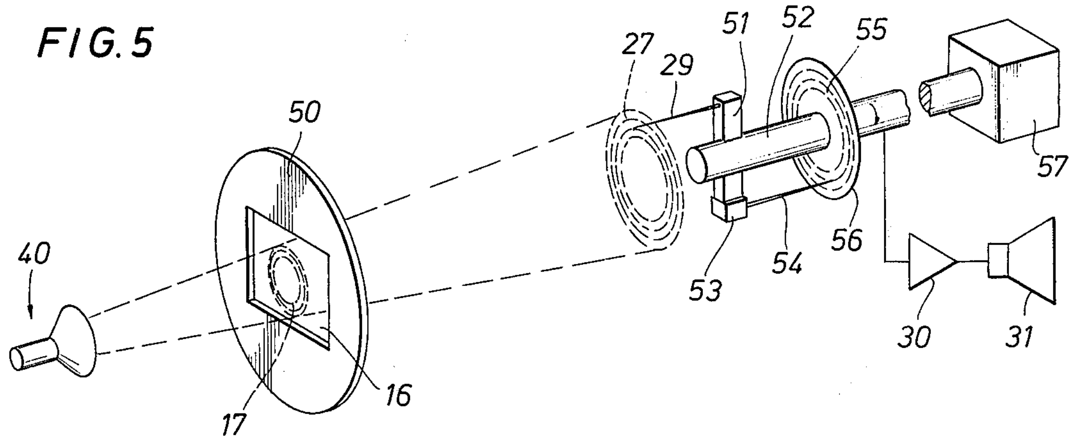

FIG. 5 is a schematic diagram of an alternate way of projecting a real image from a holographic sound recording and detecting such image.

Figure 6:
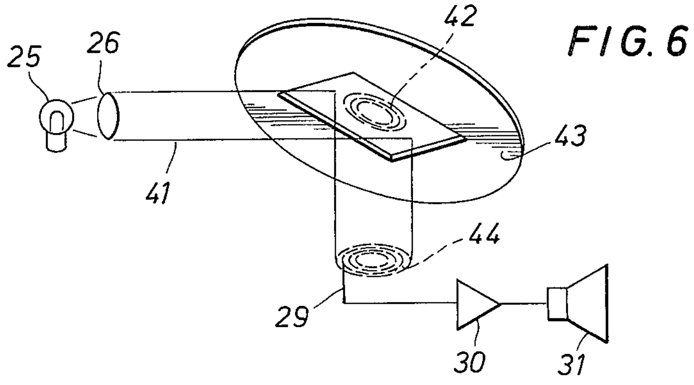

FIG. 6 is a schematic diagram of an alternate way of effecting relative motion between a projected holographic sound recording and detection means.

DESCRIPTION OF PREFERRED EMBODIMENTS

Referring now to the drawings, and first to FIG. 2, a schematic diagram of a recorder for establishing a suitable holographic sound recording is shown. A laser beam source 11 and a lens system, represented by single lens 12 in the diagram, comprise a light source 10 coherent in time and space for projecting a beam of monochromatic, coherent light 13. Located within such beam is a three-dimensional record, such as an "original" disk recording 15, and a reflecting plane 14 therebehind. Recording 15 may be any convenient recording having the sound preserved thereon in the form of varying undulations of the surface, such as in the manner used for recording sounds on phonographic disks in the prior art. Recording 15 may be the original as used in the phonograph-making art, or it may be one of the mass-produced, plastic phonograph records.

Laser beam source 11 may comprise any monochromatic laser source, such as a helium, neon CdHe gas laser, suitable for irradiating the object with coherent wave energy. Lens 12 represents any necessary lens system positioned between the laser source and the object for producing the coherent light beam 13.

The energy returned by reflecting plane 14 represents a constant or regular pattern of coherent light measured in wave lengths from the source to the reflector. The light from the plane is directed at holographic recording medium 16, which may be any suitable photographic film transparency having an exposure speed compatible with the wave lengths of the beams being received. The plane-reflected standing-wave beam is received at film 16 in a definite amplitude and polarity or phase value and in a sense provides a phase reference for producing the three-dimensional holographic recording 17.

As noted, the original recording 15 is irradiated by the coherent wave energy from the front, so that the energy is reflected and defracted or scattered back to holographic film 16. These waves follow path 18, while the reflected waves from plane 14 generally follow path 19 to film 16. Hence, the pattern at the holographic film is a combination, or modulation, of the regular pattern of the plane-reflected beam and of the irregular pattern of the reflected and defracted rays from three-dimensional recording 15. The reference beam is necessary so that the object-reflected-and-defracted waves will have a vector value relative thereto, as well as an amplitude or scalar value. A description of the principles of wavelet construction with visible coherent light is given by Emmett N. Leith and Juric Upatnieks in *Scientific American*, June 1965, Vol. 212, No. 6, in an article entitled "Photography by Laser."

Once the image has been made on the film, preserved image and film together may be referred to as a "hologram."

FIG. 4 illustrates a preferred embodiment for projecting a real image from a hologram so that it may be photo-sensitively detected for sound reproduction.

Holographic image 17 is first appropriately mounted in an apparatus for rotation. This may be done by mounting film 16 in a window of a circular turntable 22 mounted for peripheral drive by drive roller 24. A coherent light source 40, similar to source 10, projects a real image 27 from the hologram. In a preferred projection system, light source 40 comprises a beam spreader-collimator which enlarges the laer beam from a laser source and improves the resolution of the projected image.

Drive roller 24 may be a gear having teeth in its peripheral surface for mating with gear teeth 35 in the peripheral surface of turntable 22. Through a gear reduction system (not shown) the drive roller is also operably connected to rack 36 and to drive motor 37. Drive motor 37 is mounted so that it is free to move horizontally within a track. Motor 37 is held within the track, however, so that it will not be caused to rotate by its own torque.

In operation, motor 37 turns drive roller 24 in a direction 38, which causes turntable 22 to turn in opposite direction 39. Produced real image 27 is detected by photodiode 29, which is fixedly mounted so that the image is superimposed thereover.

When turntable 22 has completed one complete revolution, driver roller 24 will have been caused to move slightly to the right in rack 36 an equivalent of one groove width of the recorded image 27 as projected on the photodiode. This means that the record has been effectively played one groove, which action may continue until all of the sound recording grooves have passed by photodiode 29.

If desired, an appropriate shield 32 may be placed between turntable 22 and image 27, such shield having a window or opening 33 therein. When such a shield is employed, the entire real image is still projected from hologram 17; however, only the relevant portion of the image is made available for detection. The remainder of the image is masked by the shield.

The image which is projected into space is made to coincide or be superimposed on a photodetector 29, which may be any convenient photodiode.

A photodetector as defined herein is any device which is appropriately shaped to detect and sensitive to detect variation in electromagnetic energy as represented in a projected holographic image. Hence, light intensity variations are effectively detected. Such photodetector may be any single detector equivalent in functional operation to a single needle or stylus. When a single detector is used, it measures a single variation in light intensity at a point. The light intensity of the projected image varies with the undulations of the grooves recorded on the hologram. Therefore, the photodetector develops an electrical voltage which is proportional to such undulations. The arrangement is not unlike the physical detection of the undulations in the grooves of a record by the stylus or needle of a conventional pickup system.

A plurality of photodetectors may be positioned to detect different light variations in the undulations of the groove image, in much the same manner as a plurality of stylus detectors are employed in stereophonic mechanical reproduction to follow different contours in the mechanical grooves. To achieve the reproduction desired, the photodetectors may be positioned at appropriate angles and there may be time delay circuits employed to obtain desirable phasing between signals.

Photodiode 29 is connected to a conventional audio amplifier system 30, which is in turn connected to a loudspeaker system 31 so that acoustical energy may be developed.

An alternate method of making a hologram is shown in FIG. 3, wherein coherent beam 13 is projected through a partially reflective mirror 20. The beam portion that passes through mirror 20 is reflected off three-dimensional recording 15, as with the FIG. 2 embodiment. The reflected beam from mirror 20 follows a path 21 to holographic film 16.

Of course, any complex system of reflectors, mirrors, prisms and the like may be used to preserve recording 15 as the holographic or recording 17 on film 16.

It is possible to use the system shown in FIG. 6 as an alternate method of projecting a real image from a hologram sound recording for sound reproduction. In this system, a noncoherent light source 25 projects light through a lens system, depicted by lens 26, to produce a beam 41 toward a hologram 42 mounted on a turntable 43. This hologram is identical to the hologram of FIG. 3, except that it has had a backing placed thereon, such as by depositing onto the negative with an opaque coating. The real image which is reflected from such a hologram is shown as image 44. Detection of the sound from the hologram and the manner of revolving the turntable-mounted hologram may be done similar to that shown and described for FIG. 3.

Yet another sound reproduction system is illustrated in FIG. 5. In this embodiment, film 16 containing hologram 17 is mounted in fixed mounting jig 50. A coherent light source 40, if desired, is used to project a real image 27, as with the FIG. 3 embodiment. Photodetector 29, however, is mounted near one end of arm 51 operating in a slot in shaft 52. On the opposite end of arm 51, and on the other side of the slot in shaft 52, a weight 53 is connected to arm 51 for a purpose described hereafter. A pointed scribe 54 is connected to weight 53, the pointed end of which rides in an inverse spiral groove 55 of a disk 56 fixedly mounted around shaft 52. That is, the shaft is free to rotate through a center opening in disk 56. Motor 57 drives shaft 52.

In operation, the image is projected and the photodetector is placed in the outermost light groove. This places scribe 54 near the center of spiral groove 55. Shaft 52 is then rotated by motor 57 at the speed necessary to "play" the image. The centrifugal force caused by weight 53 and the length of arm to shaft 52 causes arm 51 to move the photodetector progressively toward the center during rotation. Scribe 54 in groove 55 maintains exact tracking of the grooves in the image by photodiode 29.

The electrical voltage from the photodetector is taken from shaft 52 by lead 57 by a slip-ring or other convenient means. As with the other systems, connection may then be made to amplifier system 30 and loudspeaker system 31, as desired.

FIG. 1 summarizes the functional operation of the entire hologram development and reproduction of sound. The steps include first making the original sound recording by conventional means, then developing a hologram from such recording, mounting either the hologram or the photodetector for rotation, projecting a real image from the hologram, detecting the projected image with the photodetector, effecting relative rotation between the image and the photodetector in such a manner so as to cause tracking of the grooves in the image by the photodetector and finally converting the detected signal from the photodetector to acoustical energy. Of course, a plurality of photodetectors may be used, as previously explained.

While particular embodiments of the invention have been shown, it will be understood that the invention is not limited thereto, since many modifications may be made and will become apparent to those skilled in the art. For example, light source 25 has been described as being coherent. A noncoherent light source may be employed, however, if desired.

What is claimed is:

1. The method of reproducing sound from a holographic sound recording, wherein the holographic sound recording is a holographic reproduction of a disk recording having sound preserved thereon by variations in the undulations of the grooves, comprising the steps of projecting the holographic sound recording to produce a real image, sensing with a photodetector the projected image to produce electrical impulses related to the holographic sound recording, spirally rotating the photodetector such that the photodetector moves with respect to the projected image by a one-groove dimension during one rotation of the photodetector, and converting the electrical impulses from the photodetector to acoustical energy susceptible of being heard.

2. Sound reproduction apparatus for producing sound from a holographic sound recording wherein the holographic sound recording is a holographic reproduction of a disk recording having sound preserved thereon by variations in the undulations of the grooves, comprising mounting means for holding the holographic sound recording, a light source for projecting a real image from the holographic sound recording, a photodetector positioned so as to be superimposed by that part of the image being detected for producing electrical impulses proportional to the light variations in the detected image, said light variations being proportional to the variations in the undulations of the grooves, means for spirally rotating said photodetector to progress a one-groove dimension with respect to the image during one rotation of said photodetector, and electrical acoustical means for converting the electrical impulses from said photodetector to acoustical energy capable of being heard.

3. Sound reproduction apparatus as set forth in claim 2, wherein said means for spirally rotating said photodetector includes rotating drive means, a shaft driven by said drive means including a slot therein, an arm translatably operating within said slot, said photodetector being connected to one end of said arm and the other end of said arm being weighted such that the relative arm segments projecting from said shaft and the weights thereof cause the arm to translate said photodetector progressively closer to said shaft upon rotation, inverse spiral track means fixedly mounted about said shaft, and scribe means connected to said arm mating to act within said spiral track means to cause said photodetector to progress one groove dimension of the image during one rotation of the photodetector about said shaft.

* * * * *